United States Patent [19]
Stagg et al.

[11] Patent Number: 5,649,824
[45] Date of Patent: Jul. 22, 1997

[54] PORTABLE HEATING DEVICE

[76] Inventors: Stanley E. Stagg, Unit 28-98 Okanagan Ave. E., Penticton BC, Canada, V2A-3J5; Donald L. Nachbar, #111-3788 West 8th Ave., Vancouver, BC, Canada, V6R 1Z3

[21] Appl. No.: 391,158

[22] Filed: Feb. 21, 1995

[51] Int. Cl.⁶ .................................... F24H 3/02
[52] U.S. Cl. ............................ 432/222; 432/219
[58] Field of Search ................ 34/97, 98; 432/219, 432/220, 221, 222, 223

[56] References Cited

U.S. PATENT DOCUMENTS

| | | | |
|---|---|---|---|
| 1,754,022 | 4/1930 | Jones . | |
| 2,077,043 | 4/1937 | Gehnrich | 158/7 |
| 2,595,773 | 5/1952 | Davis | 47/2 |
| 2,780,218 | 2/1957 | Allen | 126/110 |
| 2,788,959 | 4/1957 | Sherwin | 263/21 |
| 2,864,360 | 12/1958 | Love | 126/271.2 |
| 2,896,933 | 7/1959 | Barnes | 263/19 |
| 2,985,438 | 5/1961 | Prowler | 263/19 |
| 3,050,111 | 8/1962 | Hubbard | 158/28 |
| 3,108,586 | 10/1963 | Wilson | 126/271.2 |
| 3,112,742 | 12/1963 | Merz | 126/271.2 |
| 3,174,477 | 3/1965 | Wilson | 126/271.2 |
| 3,211,439 | 10/1965 | Fahlberg | 263/19 |
| 3,291,118 | 12/1966 | Wilson | 126/271.2 |
| 3,301,308 | 1/1967 | Briggs | 158/28 |
| 3,306,335 | 2/1967 | Myers | 158/7 |
| 3,319,947 | 5/1967 | Truesdell | 263/19 |
| 3,454,266 | 7/1969 | Mattingly | 263/19 |
| 3,593,969 | 7/1971 | Smithson et al. | 263/19 |
| 3,883,290 | 5/1975 | Windlebandt | 431/168 |
| 3,926,544 | 12/1975 | Thorpe | 431/158 |
| 4,005,976 | 2/1977 | Rombach | 431/13 |
| 4,726,767 | 2/1988 | Nakajima | 432/222 |
| 4,848,313 | 7/1989 | Velie | 126/110 |
| 4,993,944 | 2/1991 | Potter et al. | 432/222 |
| 5,009,592 | 4/1991 | Rolan et al. | 432/222 |
| 5,083,917 | 1/1992 | McCollough et al. | 432/209 |
| 5,094,082 | 3/1992 | Thompson et al. | 60/750 |
| 5,155,925 | 10/1992 | Choi | 34/97 |
| 5,156,542 | 10/1992 | Hannen et al. | 431/158 |
| 5,281,132 | 1/1994 | Wymaster | 431/351 |
| 5,344,314 | 9/1994 | Zagoroff et al. | 432/222 |

*Primary Examiner*—John M. Sollecito
*Assistant Examiner*—Gregory A. Wilson
*Attorney, Agent, or Firm*—Dowrey & Associates

[57] ABSTRACT

A portable heating unit having a housing with a carrying handle, the housing including a motor portion, a blower and an air intake. The housing also includes a mounting nose for receiving a hot air delivery barrel which has a double safety wall construction through that area in which flames for heating air will be generated. A gas nozzle assembly is received either at an angle through an opening in the barrel wall or disposed concentrically within the barrel portion for introducing gas into the barrel. The nozzle assembly draws its air supply for combustion either in the back of the nozzle member and independent of the forced air supply or through the rear end of the barrel and an igniter is provided for lighting the gas by spark means. Provision is made for igniting the combustible gas at a location apart from the turbulent forced air flow and, for safety reasons, ignition of the combustible gasses is not possible in the absence of a forced air stream for delivering the generated heat from the barrel of the device.

17 Claims, 3 Drawing Sheets

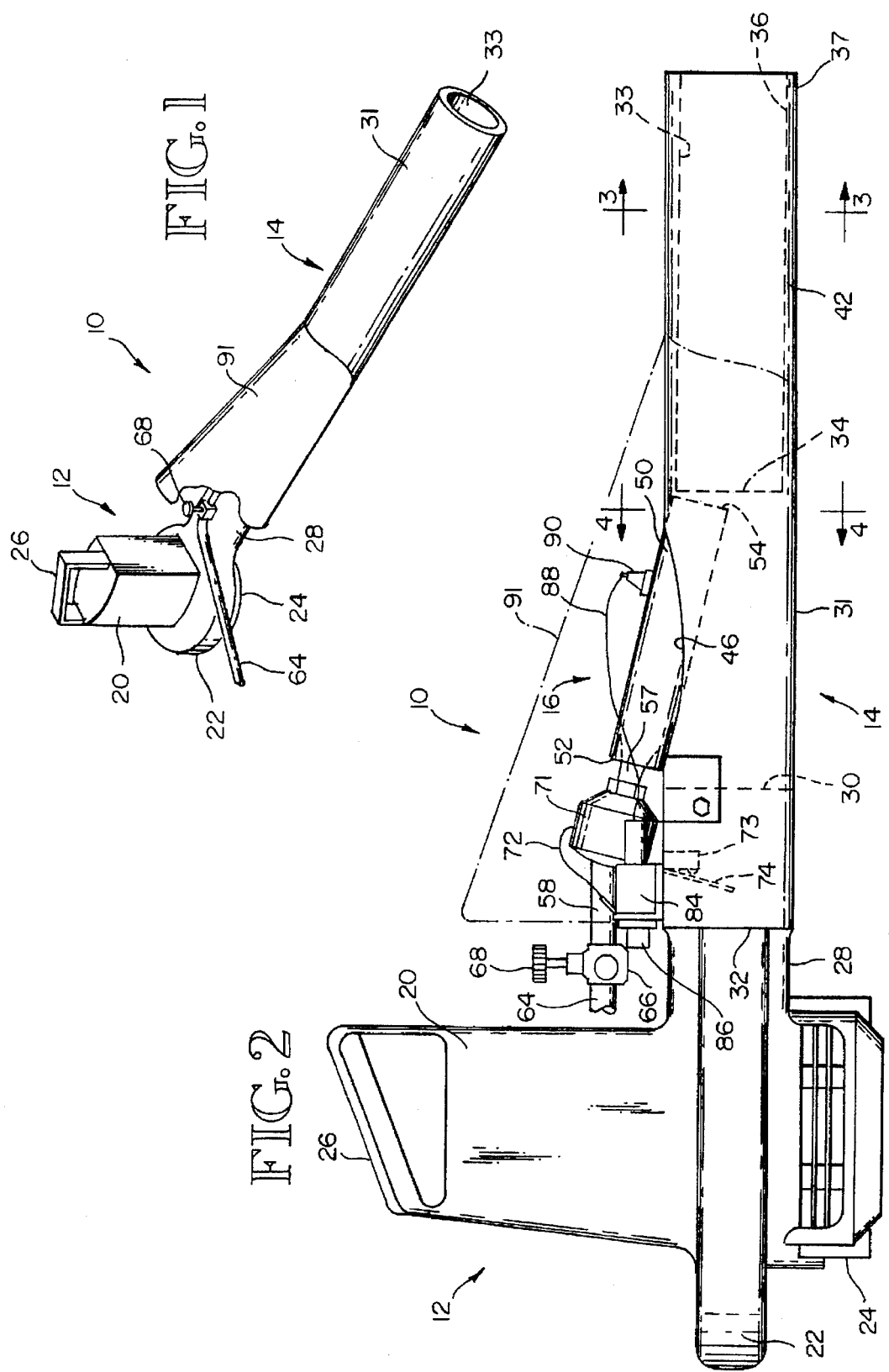

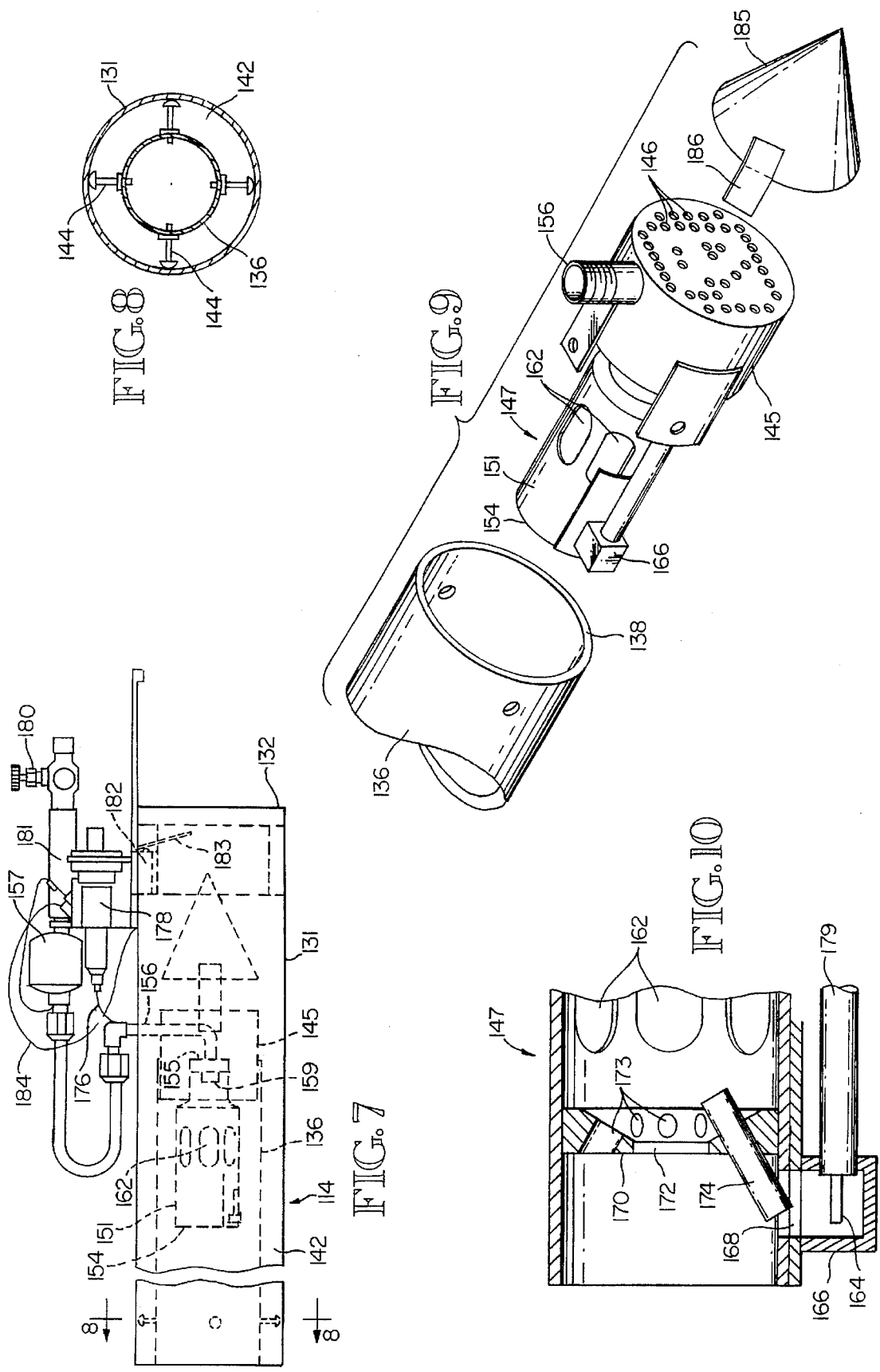

PORTABLE HEATING DEVICE

BACKGROUND OF THE INVENTION

1. Field of the Invention

The present invention relates to a portable heating device and more particularly to a novel forced hot air stream generating device. The unit is highly mobile and portable with a quick response time for a wide variety of uses such as drying freshly taped dry wall, roofing installations and other applications where a variable amount of flameless heat may be needed at a location where it would be otherwise difficult to direct heat.

2. Description of the Prior Art

There are a wide variety of space heaters available for different uses. Those skilled in the art, as in the building industry for instance, are aware of the difficulties in bringing heat to bear in various locations on construction sites and the like. Sometimes the locations are difficult to reach, are at a distance from an electrical outlet, or the heating equipment may be too heavy and cumbersome for convenient moving to the desired spot. Many times the heating equipment is needed in a location which cannot be reached unless the heating device can be carried by a worker. Frequently the heating equipment is simply too heavy.

Among the prior art patents of which applicants are aware, are U.S. Pat. Nos. 4,726,767 to Nakajima, 5,155,925 to Choi and 5,009,592 to Roldan et al. These patents disclose hot air blowing devices, as for instance hair dryers, which are hand held and self contained in that they carry their own liquified gas supply for heating the air as well as dry cell batteries for driving a small fan. The patented devices also use an ignition feature to light the gas. The devices disclosed in these patents are, however, structurally and functionally different from the present invention.

U.S. Pat. Nos. 5,156,542 to Harmen et al and 5,344,314 to Zagoroff et al are examples of hand held gas fired heat guns using barrel type mixing chambers with spark ignition features. These devices, however, rely upon the combustible-gas pressure to entrain air into the main mixing chamber or to power a turbine-compressor and are therefor distinguishable from the present invention.

U.S. Pat. No. 3,883,290 to Windelbandt shows a heating device which is used for shrinking plastic films and other applications. It has a burner head 3 with conduits or orifices 12 through which gas from line 5 is directed to the area just in front of the burner. The gas is completely combusted within a short distance of the burner. As with the devices discussed in the preceding paragraphs, this device is small and intended, as can best be determined form the disclosure, primarily as a small hand held heating apparatus for shrinking plastic wrapping films.

U.S. Pat. No. 4,005,976 to Rombach et al is a device intended to be used as a rodent exterminator. This is a gas fueled apparatus which has a frame support 15 for supporting its parts. The specific structure of the barrel may not preclude the device from being utilized in other applications, but the stated purpose is to place the muzzle of the barrel in the burrow of a rodent. Raw air and gas mixture is injected into the burrow and ignited to kill the varmints. The manner of use and design principles of this device are not anticipatory of the present invention.

The Allen heating device in U.S. Pat. No. 2,780,218 has a purpose similar to that of applicants herein, but structurally is significantly different. Air is delivered from blower 34 through hollow handle 12 to the main barrel assembly or casing 10. Air is directed between the concentric tubes and into the burner tube 44. A flame arrester 100 is provided at the outer end of the burner tube 44 so that open flames do not issue from the device. The device is intended to be portable so that it can heat different spaces and be used for different purposes.

U.S. Pat. No. 3,112,742 to Merz is a device designed to burn weeds. It is important to note in column 4, lines 33 to 37 that it is intended to eject flame outwardly form and beyond nozzle 12. This device, while having some features of the present invention, produces flame outwardly of its barrel to achieve an intended purpose. The structural combination of parts together with the design purpose of the device are of interest only.

Other references considered to be of interest only are the following U.S. Pat. Nos.

2,077,043—Genrich
2,788,959—Sherwin
2,896,933—Barnes
2,985,438—Prowler
3,306,335—Myers
3,211,439—Fahlberg
3,301,308—Briggs
3,319,947—Truesdell
3,593,969—Smithson et al
4,848,313—Velie The above cited references do not solve the problems associated with the need for a portable heating unit or disclose apparatus anticipatory of the present invention.

SUMMARY OF THE INVENTION

The heating device of this invention includes a housing portion for a fan or blower attached to an elongated barrel or tube through which air is forced by the blower to emerge as heated air at its outer, open end. A gas nozzle is disposed to enter the tube either axially or at an angle from the outside and terminate within the tube a predetermined distance inside the tube wall. The gas nozzle provides a flame within the tube outwardly of the nozzle but well back from the open end of the tube. An igniter is provided which is located outside the primary forced air stream so that gas from the nozzle may be reliably fired. Air pressure switching means is also provided which prevents ignition in the absence of forced air flow for safety purposes. The tube or barrel of the device is provided with double wall construction to reduce the possibility of burning hands or flesh accidently coming into contact with the tube. Thus, hot, flameless air is forced from the device in sufficient quantity for space warming or as an accelerated hot air stream for drying of materials if desired.

Accordingly it is among the many features of the invention to provide a fast response heating device which is simple, rugged, relatively inexpensive and has a long life. The invention is light and designed to be easily hand carried by a worker and includes safety features which lessen or eliminate the chance of explosion. The hot air generated is flameless and that portion of the barrel within which the gas flame is confined utilizes a double wall construction to protect users of the unit against burns. The amount of heated air the device is designed to produce may be varied and the device has greater flexibility of uses than known space heaters. The invention, while portable, is still capable of generating a commercial quantity of heated air. In one embodiment, the gas nozzle of the unit is designed to supply its own air rather than depending on a primary air fan for its air supply. The amount of heated air may be varied by the controls according to the requirements of a particular use.

BRIEF DESCRIPTION OF THE DRAWINGS

FIG. 1 is a perspective view of one embodiment of the device;

FIG. 2 is a side elevation view of the device of FIG. 1 showing details of construction;

FIG. 7 is an elevational view of a modification of the barrel portion of the invention;

FIG. 8 is a cross sectional view taken along line 8—8 of FIG. 7;

FIG. 9 is a partial exploded view in perspective to show additional details of gas nozzle construction; and FIG. 10 is a partial cross sectional view of the ignition area of the gas nozzle.

DESCRIPTION OF THE PREFERRED EMBODIMENTS

Figure 3:
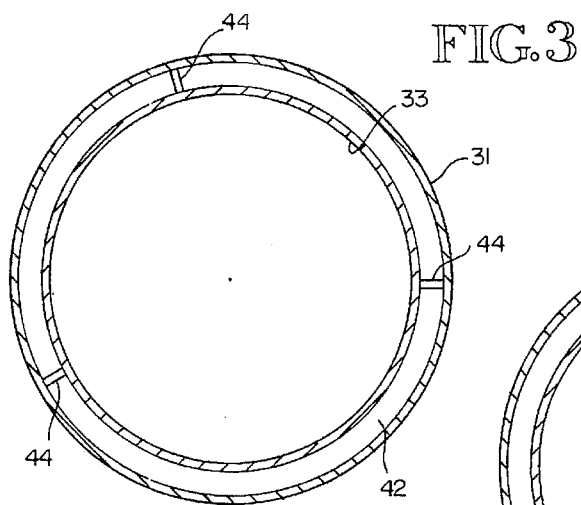
FIG. 3 is a cross sectional view taken along the line 3—3 of FIG. 2.

It will be seen by reference to FIGS. 1 and 2 of the drawings that the heater of this invention, which is generally designated by the number 10, includes a blower housing section 12, a barrel portion 14 and a fuel gas nozzle assembly 16.

Referring specifically to FIG. 2, the housing 12 contains motor section 20, fan section 22 and air intake 24 located below the blower area. At the top of the housing is located a handle or hand grip 26 and at the front of the housing, generally directly in line with the blower section 22, is barrel mounting 28 which is cylindrically shaped and extends outwardly to barrel mounting end section 30 shown in dotted line.

Figure 4:
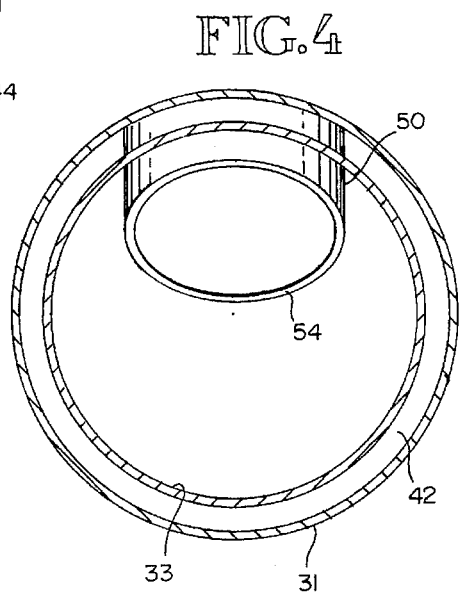
FIG. 4 is a cross sectional view taken along the line 4—4 of FIG. 2.

Supported on mounting end section 30 is the elongated cylindrical barrel section 14 having a main outer wall 31, and inner end 32 which slides onto and is secured to the mounting end 30 of section 28 of the housing. It will be noted that barrel 14 may be approximately two feet in length with a diameter of approximately 3½ inches although these dimensions may vary depending on the desired capacity of a particular unit. It will be understood that dimensions are illustrative only and not to be considered limiting. The outer half of the barrel portion 14 includes an inside wall 33 concentric with the outer main wall 31. Thus there is formed a double wall construction of the approximate outer half of the barrel 14, the purposes of which will be explained hereinafter. Inner barrel wall 33 has inner end 34 located as shown in FIG. 2 and outer end 36 which is generally flush with outer end 37 of the outer barrel wall 31. The annular space defined by the concentric construction creates a safety zone 42 which is open from the inner end 34 to outer end 36 of the inner wall 33 except for support spacers shown in FIGS. 3 and 4. Barrel 14 is of single wall construction rearwardly of inner end 34 of the inner wall 33.

Figure 6:
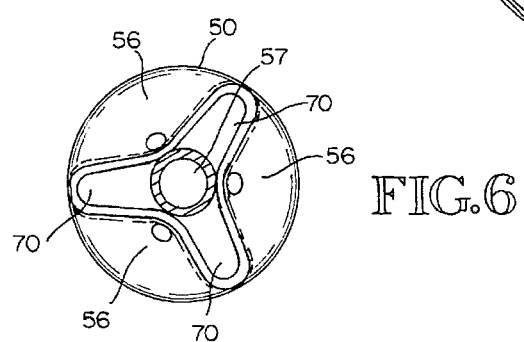
FIG. 6 is a cross sectional view of the gas .nozzle portion taken along the line 6—6 of FIG. 5.

Barrel 14 is provided with an opening or slot 46 shaped to receive the fuel gas nozzle assembly 16 now to be described in detail. The nozzle assembly 16 comprises an elongated tubular nozzle body member 50 which may be approximately 6 inches in length and approximately 1½ inches in diameter with an inlet end 52 and an outlet end 54. The nozzle member 50 at inner end 52 is crimped inwardly as at 56 at three generally equi-spaced locations, as shown most clearly in FIGS. 5 and 6, to fit onto the nose portion 57 of fitting 58. In this manner fitting 58 and tubular nozzle body 50 are firmly joined. Fitting 58 also includes a connector end to which a hose 64 or flexible tube leading to the propane or other fuel gas supply tank is attached. The gas fitting 58 also has a body portion 66 containing the valve and manual valve supply regulator control knob 68. It will be noted that crimping the inner end 52 of the tubular nozzle member 50 does not close off end 52 but does leave inlet air openings 70 as shown in detail in FIG. 6. Thus the gas nozzle provides its own induced combustion air flow apart from the forced air stream provided by the fan 22 in barrel 14.

Figure 5:
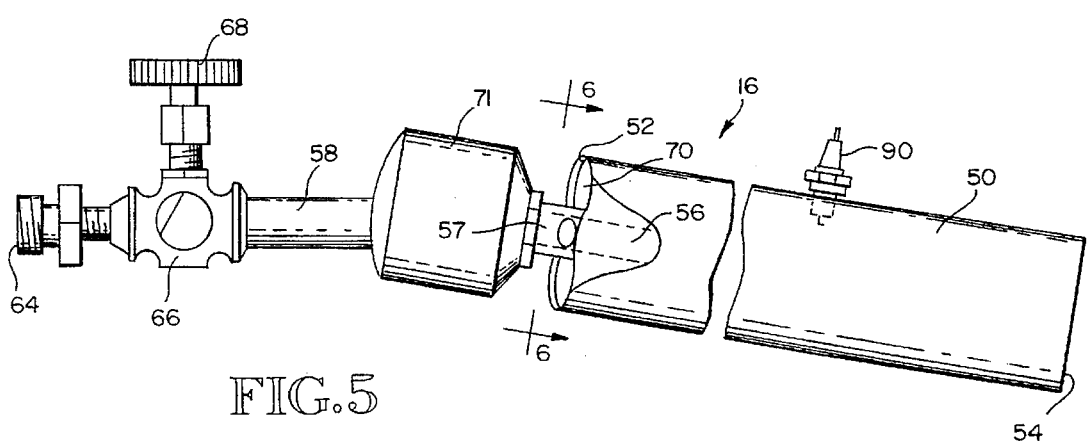
FIG. 5 is a partial view in elevation of the gas nozzle portion of the FIG. 1 heater device.

In addition to the manual valve 66–68, the gas fitting 58 is provided with a solenoid operated safety valve 71 as shown in FIGS. 2 and 5 which provides a safety control for the heating device. The solenoid valve 71 is a normally closed valve which controls gas flow from the fitting 58 to the burner nozzle Via the nose portion 57 of the fitting. The solenoid valve 71 when energized will open to allow gas to enter the burner nozzle 16. Electrical current for operating the normally closed solenoid valve may be supplied by the power source of the electric motor section 20 of the blower unit through a suitable lead wire 72. The purpose for the solenoid valve 71 is to prevent ignition of gasses in the nozzle 16 until such time as a forced air stream is created in the barrel 31 of the unit. This safety feature prevents possible explosive build-up of gasses within the barrel 31 prior to ignition, or upon the failure of ignition. Possible overheating of the entire device, including the barrel 14 and nozzle 16, due to the absence of a forced air stream is also avoided. In practice, the operation of the solenoid 71 may be a function of either the switching circuit for the blower 12 or the pressure of the air stream in the barrel. If the blower circuit is used, gas may not be introduced into the nozzle 16 until the blower is actuated. In the alternative, the solenoid valve may be controlled by an air pressure responsive switch such as the switch 73 downstream of the fan 22. The switch 73 is a normally open switch which is closed by air pressure acting on operator 74 located directly in the air stream from the fan 22. If the blower switching circuit is used, of course, gas will not be introduced into nozzle 16 until the fan 22 is actuated to create the air stream. Thus combustible gas is not admitted into the nozzle 16 without the presence of forced air stream in the barrel 14.

The nozzle assembly 16 is received in opening 46 in the barrel 14 at an angle and securely fixed in that position. For the purposes of illustration the angle at which the nozzle member 50 is secured in opening 46 is approximately 12½° from the longitudinal axis of barrel 16. The angle at which the nozzle assembly is disposed to the axis may range from as little as 7½° to as much as 85°. The preferred angle would appear to be in the range of 10° to 25°.

An igniter device 84 is supported on the barrel wall 31 as shown in FIG. 2 and includes an actuator button 86. The igniter may constitute a push button switch and is connected by lead wire 88 to spark plug 90 mounted in the wall of the nozzle body 50. Electric current may be supplied by suitable connection (not shown) to the blower circuit. With this arrangement initial ignition takes place in the nozzle assembly which has its own air supply through openings 70. Thus any problem of spark ignition in the turbulent main air stream in inner barrel member 33 is avoided.

For safety reasons a shield 91 shown in FIGS. 1 and 2 may be provided on the barrel 14. The shield may be removably mounted on the barrel by any known means such as screw fasteners or the like and will be located so as to overlie the inlet end of the nozzle 50, the gas valves and fitting 58 as well as the electrical switches 73 and 84.

In operation, when it is desired to use the unit, the gas is turned on to a desired volumetric setting by manual control knob 68. At this point gas pressure at the desired flow setting is available to the normally closed solenoid valve 71. If the valve 71 is actuated by electrical current resulting from energizing the blower unit 12 or as a result of the creation of a forced air stream in barrel 31, the valve will open, allowing gas to enter the burner nozzle 16. In the embodiment illustrated, utilizing the air pressure switch operator 74, the valve 71 will not be opened until an actual air stream is present in the barrel 31, regardless of the condition of circuit. Furthermore, any failure of the air stream results in a shut-off of the combustible gas flow. Likewise if the blower switch is turned off the valve will automatically close. The igniter button 86 will be depressed to supply electrical current to the ignition plug 90 to ignite the gas released into the nozzle assembly through fitting 58 and nose portion 57. Combustion air flow is, of course, induced through the openings 70. Gas such as propane is directed to the valve 66 and fitting 58 through a conventional hose 64. Also an electrical cord (not shown) will be provided for the blower motor in housing 12. It will be appreciated that the amount of heat measured in BTU's may be varied by controlling the air flow from blower 22 by regulating its speed and by controlling the amount of gas admitted to the unit through the valve 66. Thus, and as an example only, it may be desired to run the device at full capacity or at a fraction of total capacity. Again, it will depend on the needs of a particular application and settings on the gas and air supplies.

In the preferred embodiment of the invention shown in FIGS. 7–10, it will be seen that the gas fitting and nozzle are arranged differently within the barrel portion of the invention. Barrel section 114 has main outer wall 131 with inner end 132 which slips onto mounting section 28 of the blower housing in the same manner as described for barrel 31 shown in FIG. 2. Barrel wall 131 is provided with outer end 134 and again, overall dimensions are approximately the same as with the first embodiment but may be varied as desired to accommodate design differences.

Within main barrel wall 131 is a concentric inner wall 136 forming a double wall through substantially the entire length of outer barrel 131. Inner concentric wall 136 has inner end 138 spaced inwardly from inner end 132 of outer wall 131. Outer end 140 of the inner wall 136 is open and generally flush with outer end 134 of the outer barrel wall. The area defined by the concentric construction creates an annular safety zone 142 as best seen in FIGS. 7 and 8. Spacers 144 hold inner barrel wall 136 in position within the outer barrel.

Inner barrel 136 at its inner end 138 is open or provided with a metal screen or stamped metal air intake section 145 with openings 146 as shown in FIGS. 7 and 9. It will be noted that the air intake section 145 is separate from the main portion of barrel 136 primarily for fabrication and assembly purposes as will be presently understood. FIG. 7 shows the section 145 in its assembled position.

The intake section 145 serves as a mounting for a gas nozzle assembly 147 in the inner end of the inner wall 136. The nozzle 147 includes elongated tubular nozzle body 151 having gas outlet end 154 and gas inlet end 155. Nozzle assembly 147 is connected to fuel intake line 156 and gas inlet line 158 via a solenoid valve 157 presently to be described. Combustible gas outlet 159 is located within the nozzle assembly 147 as indicated in FIG. 7.

The cylindrical nozzle body 151 is provided with mixing air circulation openings 162 and is fitted with an igniter element 164 near the outlet end 154. The igniter element is located within box-like housing 166 attached to nozzle wall. Igniter housing 166 opens as at 168 through the nozzle wall at or in close proximity to end 154. Within the nozzle body 151 is a partial partition 170 in the form of an annular wall which is open in the center as at 172 and through which gas flows. Additionally, partition 170 includes circumferentially spaced passages 173 which permit gas flow. A small diameter diverter tube 174 is located in one such passage for directing a portion of the air-gas mixture stream toward the igniter element 164 in the housing 166. When the pressurized gas flow is begun, the igniter is actuated to ignite the gas from gas outlet 159.

With this arrangement it will be noted that ignition takes place initially within the igniter housing 166 which is located away form the turbulent main stream of combustible air-gas mixture emitted through the central opening 172 and spaced openings 173. It will be remembered that not only has the forced air stream from blower fan 22 been initiated prior to ignition but the gas stream itself is under significant pressure which, in the case of propane, may be as high as 20 psi. The divergence of a portion of the pressurized air-gas stream through the small diverter tube 174 into the housing 166 facilitates ignition which may otherwise be difficult in the turbulence of the main air-gas stream.

Igniter 164 is an electrical spark device which arcs from the igniter tip to the housing wall. The igniter is an insulated wire 176 extending from the bare igniter element to igniter actuator 178 mounted on the outside of barrel 131. The actuator may be a push button switch such as described with relation to the igniter 84 of the FIGS. 1–6 embodiment with current being supplied by the blower unit. In the immediate area of the burner nozzle 147, the electrical lead wire 176 is protected by a heat resistant tube 179 which may be connected to the igniter housing 166.

The solenoid valve 157 is a normally closed safety valve connected to the fitting 181 similar to the valve 71 described with relation to the FIGS. 1–6 embodiment. In addition, a manually operated valve 182 is connected between the fitting 181 and the gas supply and acts as an on-off and flow regulator valve. The solenoid valve 157 operates when energized to open and allow gas to enter the nozzle 147 via the intake line 156. Operation of the solenoid valve may be a function of the blower switch as previously described so that gas may not be introduced into nozzle 147 until the blower is turned on. Preferably, however, an air pressure responsive switch 182, which is normally open, is closed by air pressure acting on the switch operator 183 connected to the solenoid via the lead 184. With this arrangement combustible gas is not admitted to the nozzle 147 without the presence of a forced air stream in the barrel 134.

It will be noted in FIGS. 7 and 9 that a conical shaped air deflector element 185 is attached by several metal straps 186 to end section 145 of the inner barrel tube 136. Spacing of the air deflector from screen 146 is approximately ⅝ inch but may vary as needed or desired.

Other fuels such as natural gas and methane may be used, but propane is more widely accessible. The gas flame of the present invention will occur only within barrels 14 and 131 so that only heated air with no flame emerges from the outer ends 36, 37 and 134, 140 respectively. The double wall construction from the end of the gas nozzle to the outer end of the barrel allows air from the blower to pass through the annular spaces 42 and 142 as well as to provide air for combustion within the barrel. Thus, the outer barrel walls 31 and 131 are maintained cool enough so that the operator can touch the barrel and run no risk of being burned. It will be appreciated too, that conventional small internal combustion engines may be employed to drive the blower in place of an electric motor. In this instance, however, a separate source of electrical power would have to be supplied for the solenoid safety valve and ignition systems.

The present invention has been described with reference to a preferred embodiment and certain modifications. Further modifications and alterations may become apparent to one skilled in the art upon reading and understanding this specification which is intended to include all such modifications and alterations within the scope of the appended claims.

What is claimed is:

1. A portable hot air generating heating device comprising;
    a housing device having carrying handle means, a blower, blower motor means for driving said blower, air intake means and a mounting nose portion through which air is directed by said blower,
    an elongated cylindrical barrel member received on and detachably secured to said mounting nose portion of said housing, said barrel member having double wall construction whereby an outer barrel wall and an inner safety wall extend through a predetermined area where flame is generated to heat air from said blower, said inner safety wall being concentrically spaced from said outer wall to define an annular cooling space through which air from said blower may be directed,
    said barrel member including an elongated opening,
    a gas nozzle assembly mounted at an angle in said barrel member and including a control valve means and a gas nozzle member attached to said valve means, said gas nozzle member having an outer end portion received in said opening,
    said opening being positioned such that said outer end of the gas nozzle is located generally adjacent the inner end of said double wall construction of the barrel member, said nozzle assembly extending into said barrel member such that flame from gas in said nozzle member is generated within said barrel area having double wall construction, and
    power means for driving said blower, fitting means for attaching a gas supply line to said control valve means, and igniter means for igniting gas in said nozzle member.

2. The portable heating device according to claim 1 wherein said nozzle member is disposed at an angle of from approximately 7½° to approximately 85° to the longitudinal axis of said barrel member.

3. The portable heating device according to claim 1 wherein said nozzle member is disposed at an angle of from approximately 10° to approximately 25° to the longitudinal axis of said nozzle member.

4. The device according to claim 1 wherein;
    forced air directed by said blower through said barrel member comprises a primary forced hot air stream, and
    said ignition means being mounted on said nozzle member out of the path of said primary forced air stream,
    whereby ignition of the gas initially occurs in said nozzle unaffected by forced air stream turbulence.

5. The device according to claim 1 including;
    a normally closed safety shut-off valve down stream from said control valve,
    said safety valve being responsive to positive forced air stream flow in said barrel for admitting combustible gas to said nozzle member.

6. A portable hand held heating device comprising in combination;
    a hand held blower unit having an air inlet and a forced air outlet,
    an elongated barrel detachably mounted on said blower unit in communication with said forced air outlet, said barrel including a double wall construction over a predetermined area where flame is generated to heat the air from said blower and to define an annular cooling space through which air from said blower may be directed,
    a gas burner nozzle assembly mounted at an angle in the wall of said barrel member and positioned such that flame from said burner nozzle is generated within said double wall construction, said forced air directed by said blower through said barrel member comprising a primary forced hot air stream, and
    an igniter mounted on said burner nozzle out of the path of said primary forced air stream for igniting gas in said burner nozzle,
    whereby ignition of the gas initially occurs in said burner nozzle unaffected by forced air stream turbulence.

7. The device according to claim 6 including;
    a normally closed safety gas shut-off valve for said gas burner nozzle,
    said safety valve being responsive to positive forced air stream flow in said barrel for admitting combustible gas to said burner nozzle.

8. A portable hot air generating heating device, comprising;
    a housing having carrying handle means, a blower, blower motor means for driving said blower, air intake means and a mounting nose portion through which air is directed by said blower,
    an elongated cylindrical barrel member having a forced air intake end received on and detachably secured to said mounting nose portion of said housing, said barrel member having double wall construction whereby an outer barrel wall and an inner safety wall extend through a predetermined area where flame is generated to heat air from said blower, said inner safety wall being concentrically spaced from said outer wall to define an annular cooling space through which air from said blower may be directed,
    a gas nozzle assembly mounted in said barrel member adjacent the forced air intake end thereof and including control valve means and an elongated cylindrical gas nozzle member attached to said valve means, said nozzle member including air intake openings for receiving at least a .portion of the air from said blower,
    mounting means mounting said nozzle assembly within said inner safety wall and extending concentrically therewith such that flame from said nozzle member is generated within said barrel area having double wall construction,
    power means for driving said blower,
    fitting means for attaching a gas supply line to said control valve means, and igniter means for igniting gas in said nozzle member including an ignition chamber mounted on the wall of said nozzle member including an opening communicating therewith, a spark ignition element in said chamber for creating a live spark therein, and a small diameter diverter tube in said nozzle member for diverting a small stream of forced air-gas mixture to said chamber for initial ignition out of the path of the forced air stream in said nozzle member.

9. The device according to claim 8 including;

an air stream diverter shield positioned between the forced air intake end of said barrel and the air intake openings in said nozzle member, said shield including diverter surfaces for directing a portion of the air stream from said blower into said cooling space while allowing forced air to be drawn into said nozzle member for combustion purposes.

10. The device according to claim 8 including;

a normally closed safety shut-off valve down stream from said control valve, said safety valve being responsive to positive forced air stream flow in said barrel for admitting combustion gas to said nozzle member.

11. A portable heating device comprising in combination;

a blower unit having an air inlet and a forced air outlet, an elongated barrel detachably mounted on said blower unit in communication with said forced air outlet for conducting a main forced air stream for heating, said barrel including a double wall construction over a predetermined area where flame is generated to heat said main forced air stream and to define an annular cooling space thereabout through which a portion of the air from said blower may be directed, a gas burner nozzle having a cylindrical nozzle body mounted at an angle in the wall of said barrel member and extending into said barrel member and positioned such that flame from said burner nozzle is generated within said double wall construction, an igniter located within said nozzle body for igniting air-gas mixture within said burner nozzle out of the path of said main forced air stream whereby turbulence of said main forced air stream is avoided during ignition of said burner.

12. The device of claim 11 including;

a normally closed safety gas shut-off valve for said gas burner nozzle, said safety valve being responsive to positive forced air stream flow in said barrel for admitting combustible gas to said burner nozzle.

13. A portable heating device comprising in combination;

a blower unit having an air inlet and a forced air outlet, an elongated barrel detachably mounted on said blower unit in communication with said forced air outlet for conducting a main forced air stream for heating, said barrel including a double wall construction over a predetermined area where flame is generated to heat said main forced air stream and to define an annular space thereabout through which a portion of the air from said blower may be directed, a gas burner nozzle, mounting means mounting said burner nozzle within said double wall construction extending concentrically therewith and positioned such that flame from said burner nozzle is generated within said double wall construction, said gas burner nozzle being connected to a combustible gas supply line and air intake openings in said burner nozzle for admitting air from said main forced air stream as a source of combustion air, an igniter for igniting air-gas mixture within said burner nozzle;

said igniter comprising an ignition chamber mounted on the wall of said burner nozzle and including an opening communicating therewith, a spark ignition element in said chamber for creating a live spark therein, and a small diameter diverter tube in said burner nozzle for diverting a small stream of forced air-gas mixture to said chamber for initial ignition out of the path of the main forced air stream in said nozzle member, whereby turbulence of said main forced air stream is avoided during ignition of said burner.

14. The device of claim 13 including;

a normally closed safety gas shut-off valve for said gas burner nozzle, said safety valve being responsive to positive forced air stream flow in said barrel for admitting combustible gas to said burner nozzle.

15. A hot air generating heating device comprising in combination;

a blower unit having an air inlet and a forced air outlet, an elongated barrel connected to said blower unit in communication with said forced air outlet for conducting a forced air stream for heating, a gas burner nozzle mounted in said barrel member and positioned such that flame from said burner nozzle is generated within said barrel, said gas burner nozzle being connected to a combustible gas supply line and a source of combustion air, an igniter for igniting air-gas mixture within said burner nozzle, said igniter comprising an ignition chamber mounted on the wall of said burner nozzle and including an opening communicating therewith, a spark ignition element in said chamber for creating a live spark therein, and a small diameter diverter tube in said burner nozzle for diverting a small stream of air-gas mixture to said chamber for initial ignition out of the path of the forced air stream.

16. The device of claim 15 including;

a control valve for controlling the combustible gas supply line, and a normally closed safety shut-off valve in said supply line down stream from said control valve, said safety valve being responsive to positive forced air stream flow in said barrel for admitting combustible gas to said nozzle member.

17. A hot air generating heating device comprising in combination;

a blower unit having an air inlet and a forced air outlet, an elongated barrel connected to said blower unit in communication with said forced air outlet for conducting a forced air stream for heating, a gas burner nozzle mounted in said barrel member and positioned such that flame from said burner nozzle is generated within said barrel, said gas burner nozzle being connected to a combustible gas supply line and a source of combustible air, an igniter mounted on said burner nozzle for igniting air-gas mixture with said nozzle out of the path of said forced air stream, a control valve for controlling the combustible gas supply line, and a normally closed safety shut-off valve in said supply line down stream from said control valve, said safety valve being responsive to forced air stream flow in said barrel for admitting combustible gas to said nozzle member.

* * * * *

UNITED STATES PATENT AND TRADEMARK OFFICE
CERTIFICATE OF CORRECTION

PATENT NO. : 5,649,824
DATED : July 22, 1997
INVENTOR(S) : Stanley E. Stagg; Donald L. Nachbar It is certified that error appears in the above-identified patent and that said Letters Patent are hereby corrected as shown below:

Col 3, line 17 cancel the period (.) after "gas".
    Col 4, line 23 change "Via" to --via--.

Signed and Sealed this

Eighteenth Day of November 1997

*Attest:*

BRUCE LEHMAN

*Attesting Officer*   *Commissioner of Patents and Trademarks*